Patented Mar. 20, 1951

2,546,138

UNITED STATES PATENT OFFICE 2,546,138

HETEROCYCLIC BENZANTHRONE COMPOUNDS

Wilhelm Schmidt-Nickels, Little York, N. J., assignor to General Aniline & Film Corporation, New York, N. Y., a corporation of Delaware No Drawing. Application December 31, 1948,
Serial No. 68,727

8 Claims. (Cl. 260—276)

This invention relates to new heterocyclic benzanthrone compounds.

The compounds of my invention are benzanthroneacridone and benzanthronethioxanthone and the monobrom derivatives thereof carrying the bromine atom in the Bz-1 position. They have the probable general formula:

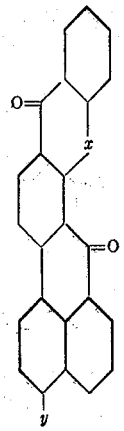

wherein $x$ represents a hetero group which may be sulfur or the imino group and $y$ is hydrogen or bromine.

The new heterocyclic benzanthrone compounds are useful as intermediates for the formation of vat dyestuffs. For example, vat dyestuffs may be prepared by subjecting the unbrominated compounds to fusion in alcoholic potassium hydroxide and the monobrom derivatives to condensation with aminoanthraquinones.

The benzanthroneacridone and benzanthronethioxanthone compounds are prepared by the action of iron and glycerine in strong sulfuric acid on anthraquinone-2,1-acridone and anthraquinone-2,1-thioxanthone respectively.

The monobrom derivatives are prepared by the direct bromination of the benzanthroneacridone and benzanthronethioxanthone compounds in nitrobenzene to which is added a proportion of bromine calculated to introduce but one atom of bromine into the molecule of the starting compound, and a small amount of iodine to promote the bromination. The bromination is carried out by stirring the reaction mixture at a temperature of 155 to 160° C. for 3 hours. The reaction mixture is allowed to cool to room temperature, stirred with a relatively large volume of alcohol, whereupon the bromination product is filtered, washed with alcohol and dried.

The preparation of my new heterocyclic benzanthrone compounds is illustrated in a more specific manner in the following examples. Parts are by weight and both parts and volumes are in the metric system.

Example 1

950 parts conc. sulfuric acid (96%) and 114 parts anthraquinone-2,1-thioxanthone are stirred at room temperature for ½ hour to obtain complete solution. After application of a cooling bath to keep the temperature below 30° C., 41.3 parts of water is dropped into the solution. The amount of water is calculated to lower the acidity to a $H_2SO_4$ concentration of 92%. Temporarily precipitated product goes in solution again after stirring for a few minutes. The solution is heated to 115° C. At 115–120° C. there is gradually added during 2 hours a mixture of 92 parts glycerol and 93 parts iron borings. After all is introduced, the mixture is stirred at 115–120° C. for 4 hours. The reaction product is poured into water, filtered and washed with water. The cake is charged into a solution of 2500 parts water and 790 parts by volume conc. hydrochloric acid (35%). After refluxing overnight to dissolve the iron, the material is filtered and washed with water until neutral. The wet cake is introduced into a mixture containing 1500 parts water, 100 parts by volume 20% sodium hydroxide solution, 1000 parts by volume 16% sodium hypochlorite solution. The charge is again refluxed overnight. The product is then filtered, washed with water until neutral and dried. Product obtained=110.9 parts. A portion of the product was sublimed at a pressure of 1 mm. and at a temperature rising to 380° C. Calculated on the basis of the sublimed product, the yield was 72% of theory. The product is benzanthrone-5,6-benzthioxanthone of the formula:

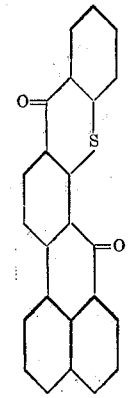

A sample of benzanthronethioxanthone melted in alcoholic potassium hydroxide at 210° C. gave a blue vat dyestuff. The dyeing on cotton was chlorine fast.

Example 2

300 parts by volume nitrobenzene, 18.2 parts benzanthronethioxanthone (unsublimed, prepared as described in Example 1), 5.1 parts by volume bromine and 2 parts iodine is stirred at 155–160° C. for 3 hours. After allowing to cool to room temperature, 1000 parts by volume alcohol is stirred with the mixture. The bromination product is then filtered, washed with alcohol and dried. The product is Bz-1-brombenzanthrone-5,6-benzthioxanthone.

*Example 3*

271 parts conc. sulfuric acid (96%) and 32.5 parts anthraquinone-1,2-acridone is stirred at room temperature for 1 hour to obtain complete solution. After application of a cooling bath to keep the temperature below 30° C., 11.8 parts of water is dropped into the solution. The amount of water is calculated to lower the acidity to that of 92% $H_2SO_4$. The solution is heated to 115° C. Then at 115–120° C., there is gradually added during 2 hours a mixture of 27.6 parts glycerol and 27.9 parts iron borings. After all is introduced the mixture is stirred at 115–120° C. for 4 hours. The reaction product is poured into water, filtered and washed with water. The cake is charged into 780 parts water and 260 parts by volume conc. hydrochloric acid (35%). After refluxing overnight to dissolve the iron, the material is filtered and washed until neutral. The wet cake is introduced into a mixture of 450 parts water, 30 parts by volume 20% sodium hydroxide solution and 300 parts by volume 16% sodium hypochloride solution. The charge is again refluxed overnight. The product is then filtered, washed with water until neutral and dried. Product obtained=28.8 parts. Sublimation: Sample=3 parts. Calculated on the basis of sublimed product (sublimate obtained at 1 mm. pressure and a temperature rising to 340° C.), the yield was 51% of theory. The product is benzanthrone-5,6-benzacridone of the formula:

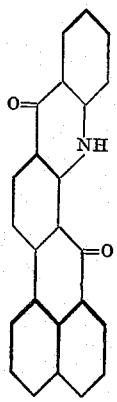

I claim:
1. A compound of the general formula,

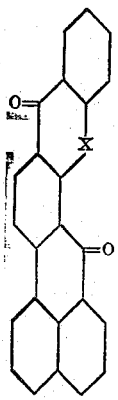

wherein X is selected from the group consisting of sulfur and imino groups.

2. A compound of the general formula,

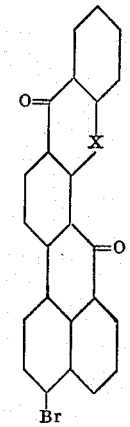

wherein X is selected from the group consisting of sulfur and imino groups.

3. A process for preparing compounds of the general formula,

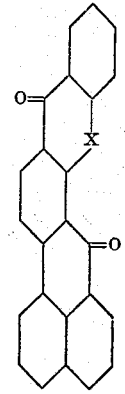

wherein X is selected from the group consisting of sulfur and imino groups, which comprises reacting a compound selected from the group consisting of anthraquinone-2,1-thioxanthone and anthraquinone-2,1-acridone with glycerine in the presence of iron and sulfuric acid.

4. A process for preparing compounds of the general formula,

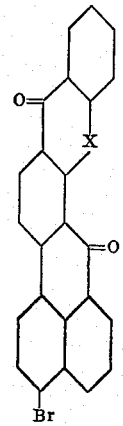

wherein X is selected from the group consisting of sulfur and imino groups, which comprises reacting a compound selected from the group consisting of anthraquinone-2,1-thioxanthone and anthraquinone-2,1-acridone with glycerine in the presence of iron and sulfuric acid, and brominating the reaction product.

5. The compound of the formula,

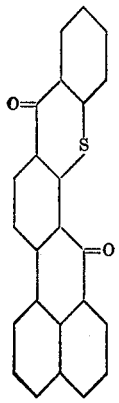

6. The compound of the formula,

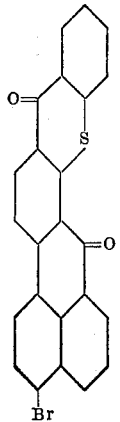

7. The compound of the formula,

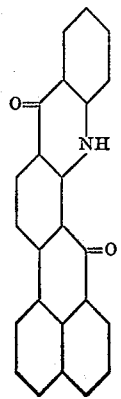

8. The compound of the formula,

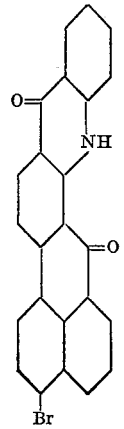

WILHELM SCHMIDT-NICKELS.

REFERENCES CITED

The following references are of record in the file of this patent:

UNITED STATES PATENTS

| Number | Name | Date |
|---|---|---|
| 1,861,921 | Honald | June 7, 1933 |
| 1,924,446 | Kunz et al. | Aug. 29, 1933 |
| 1,939,011 | Kunz et al. | Dec. 12, 1933 |
| 2,441,512 | Scalera | May 11, 1948 |

FOREIGN PATENTS

| Number | Country | Date |
|---|---|---|
| 326,148 | Great Britain | Mar. 4, 1930 |
| 258,561 | Germany | Apr. 7, 1931 |
| 541,265 | Germany | Jan. 11, 1932 |
| 39,801 | France | Mar. 18, 1932 |
| | (Addition to No. 699,492) | |

OTHER REFERENCES

Office Technical Services Report PB73919 frame 2224–2231. Date release Mar. 19, 1948.